(12) United States Patent
Heid et al.

(10) Patent No.: US 8,726,442 B2
(45) Date of Patent: May 20, 2014

(54) DEVICE FOR SUPPORTING A SIDE WASHING BRUSH, AND VEHICLE WASHING SYSTEM HAVING SUCH A DEVICE

(75) Inventors: Claus Heid, Stuttgart (DE); Andre Speckmaier, Wuestenrot (DE); Yann Veitz, Vaihingen/Enz (DE); Ingo Feistkorn, Friedelsheim (DE); Bernd Knisel, Leonberg (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 0 days.

(21) Appl. No.: 13/604,409

(22) Filed: Sep. 5, 2012

(65) Prior Publication Data

US 2013/0056609 A1 Mar. 7, 2013

Related U.S. Application Data

(63) Continuation of application No. PCT/EP2010/052912, filed on Mar. 8, 2010.

(51) Int. Cl.
*B60S 3/06* (2006.01)
(52) U.S. Cl.
USPC .............................. 15/53.2; 15/53.3; 15/97.3
(58) Field of Classification Search
USPC ........................... 15/53.2, 53.3, 97.3, DIG. 2
See application file for complete search history.

(56) References Cited

U.S. PATENT DOCUMENTS

| 3,868,740 | A | | 3/1975 | Brovig | |
|---|---|---|---|---|---|
| 4,270,958 | A | | 6/1981 | Ennis | |
| 4,513,467 | A | | 4/1985 | Roncaglione | |
| 5,361,443 | A | | 11/1994 | Belanger et al. | |
| 5,367,736 | A | * | 11/1994 | Kaady et al. | 15/53.3 |
| 5,813,077 | A | * | 9/1998 | Belanger et al. | 15/97.3 |
| 7,168,123 | B2 | * | 1/2007 | Ennis | 15/53.2 |

FOREIGN PATENT DOCUMENTS

| DE | 28 49 662 B1 | 4/1980 |
|---|---|---|
| DE | 32 39 530 A1 | 7/1983 |
| DE | 195 14 047 A1 | 10/1996 |
| GB | 2 110 176 A | 6/1983 |

* cited by examiner

*Primary Examiner* — Robert Scruggs
(74) *Attorney, Agent, or Firm* — Womble Carlyle Sandridge & Rice, LLP

(57) ABSTRACT

A device for supporting a side washing brush of a vehicle washing system is provided, which brush is rotatable about a rotational axis, the device including a bearing apparatus for rotatably supporting a drive shaft, and a holding apparatus which is fixedly connected to the bearing apparatus and which is held on a frame by means of elastic cushioning elements arranged above and below the holding apparatus. To improve the device in such a way that the risk of damage to the cushioning elements is reduced, it is proposed that the holding apparatus can be acted on by the cushioning elements only by compressive forces aligned in the direction of the holding apparatus. A vehicle washing system is also proposed which has at least one device of this type, on which a side washing brush is mounted.

16 Claims, 3 Drawing Sheets

DEVICE FOR SUPPORTING A SIDE WASHING BRUSH, AND VEHICLE WASHING SYSTEM HAVING SUCH A DEVICE

CROSS-REFERENCE TO RELATED APPLICATIONS

This application is a continuation of international application number PCT/EP2010/052912, filed on Mar. 8, 2010, which is incorporated herein by reference in its entirety and for all purposes.

BACKGROUND OF THE INVENTION

The invention relates to a device for supporting a side washing brush of a vehicle washing system, which brush is rotatable about a rotational axis, the device including a bearing apparatus for rotatably supporting a drive shaft, and a holding apparatus which is connected to the bearing apparatus and which is held on a frame by means of elastic cushioning elements arranged above and below the holding apparatus.

The invention further relates to a vehicle washing system having such a device and a side washing brush mounted on the device.

For cleaning a vehicle in a vehicle washing system, at least two side washing brushes are usually used which may be rotated about vertically aligned rotational axes and which are used for cleaning the side parts of the vehicle. The side washing brushes contact the side parts of the vehicle, but must not be allowed to exert excessively high pressures on the vehicle, since otherwise there is risk of damage to the vehicle. For this reason, the side washing brushes in each case are usually pivotably mounted above the vehicle on a device. The device includes a bearing apparatus which supports a drive shaft that is connectable to the side washing brush in a rotationally fixed manner. The bearing apparatus is held on a holding apparatus which in turn is held on a frame of the device. The connection between the holding apparatus and the frame is established via elastic cushioning elements which are arranged above and below the holding apparatus and which accommodate the holding apparatus, in certain areas, between them. With the aid of the elastic cushioning elements, it is ensured that the side washing brush which is connected to the drive shaft may be deflected from the vertical direction during cleaning of a vehicle without this resulting in damage to the bearing apparatus or the frame. The side washing brush is thus pivotably supported by means of the cushioning elements so that it is able to tilt in order to reach vehicle parts extending at an angle.

A device of the above-mentioned type is known from DE 32 39 530 A1. In this respect, the holding apparatus has an annular disk which surrounds the bearing apparatus in the circumferential direction. The annular disk is situated between resilient upper cushioning elements and resilient lower cushioning elements which in each case are screwed to the annular disk and to fixed counter-supports. When the side washing brush deflects from the vertical direction, the cushioning elements exert elastic tensile forces and compressive forces on the annular disk. The side washing brush may thus undergo a deflecting motion. However, there is a risk that the cushioning elements may be damaged, in particular for larger deflections of the side washing brush.

It is an object of the present invention to improve a device of the generic kind for supporting a side washing brush, which is rotatable about a rotational axis, in such a way that the risk of damage to the cushioning elements for fairly large deflections of the side washing brush is reduced, and the service life of a vehicle washing system having this type of device and a side washing brush mounted thereon may be prolonged.

SUMMARY OF THE INVENTION

This object is achieved according to the invention by a device of the type stated at the outset, in that the holding apparatus can be acted on by the cushioning elements only by compressive forces aligned in the direction of the holding apparatus.

The concept is incorporated in the invention that the risk of damage to the elastic cushioning elements may be reduced, in particular for fairly large deflections of the side washing brush, in that the elastic cushioning elements exert only compressive forces, but not tensile forces, on the holding apparatus. The cushioning elements are thus acted on solely by compression, not by being stretched. Since there is a risk of damage to the cushioning elements in particular under high tensile stress, this type of risk is avoided in the device according to the invention due to the cushioning elements being subject only to a compressive load, and the cushioning elements exerting compressive forces on the holding apparatus.

In the device according to the invention, the elastic cushioning elements accommodate the holding apparatus, at least in certain areas, between them. For a vertical orientation of the side washing brush, the holding apparatus takes up a central position. When the side washing brush is inclined with respect to the vertical, the holding apparatus is deflected from the central position. The cushioning elements exert elastic compressive forces on the holding apparatus in order to return the holding apparatus together with the side washing brush to the starting position. However, it is not possible for the cushioning elements to exert tensile forces on the holding apparatus.

The cushioning elements may rest against the holding apparatus at the top and bottom without the interposition of connecting elements. If the holding apparatus moves away from a lower cushioning element, for example, during a deflection from the central position, the force exerted on the holding apparatus by this cushioning element is reduced, whereas an upper cushioning element is compressed, and therefore the holding apparatus is acted on by a compressive force.

The holding apparatus is advantageously held on the frame solely by means of the cushioning elements.

It may be provided that the upper and the lower cushioning elements are elastically preloaded in a central position of the holding apparatus in which the drive shaft is vertically oriented, so that the at least one upper cushioning element as well as the at least one lower cushioning element act on the holding apparatus with a compressive force.

Alternatively, it may be provided that in its central position the holding apparatus is acted on solely by the lower cushioning elements with a compressive force which counteracts the weight force of the holding apparatus, but the upper cushioning elements, except for their own weight force, rest free of force on the top side of the holding apparatus. In such an embodiment of the invention, the at least one upper cushioning element does not exert a compressive force on the holding apparatus until the holding apparatus is deflected from the central position, so that the holding apparatus is acted on by a resilient restoring force in the direction of its central position.

In one particularly preferred embodiment of the invention, an upper cushioning element and a lower cushioning element in each case are jointly surrounded by a rigid counter-support which is fixed to the frame. The counter-support forms a common mounting for an upper and a lower cushioning element on which the two cushioning elements may be supported.

The counter-support advantageously has a C-, Ω- or U-shaped design. The counter-support may have two legs, for example, which are connected to one another via a web. The two legs may be oriented parallel to the drive shaft and be connected to one another via the web. The web may be linear over its entire length, although it may also be provided that the web is curved or bent in a V shape.

The two legs are advantageously connected to the web to form one piece.

It is particularly advantageous if the legs carry holding tabs at their free ends for receiving connecting elements. The legs may be connected to the frame via the connecting elements. For example, it may be provided that the legs are screwed to the frame.

It is particularly advantageous if the legs have strip-shaped projections at their longitudinal edges which engage behind the upper cushioning element and the lower cushioning element. The upper and lower cushioning elements may thus be fixed to the frame in a simple manner so as to be durable under mechanical load.

In one advantageous embodiment, the counter-support is formed from a flat material. In particular, it may be provided that the counter-support is formed from sheet metal.

To simplify installation of the device according to the invention, in one advantageous embodiment it is provided that the counter-support is detachably connectable to the frame.

It is advantageous if in each case an upper cushioning element rests on a lower cushioning element. The two cushioning elements may directly abut one another.

The holding apparatus may be configured in the form of a retaining plate through which the bearing apparatus passes. The retaining plate may be situated between an upper cushioning element and a lower cushioning element, and may be acted on by these with compressive forces.

In one particularly advantageous embodiment of the device according to the invention, the holding apparatus has a plurality of holding arms, each of which has a holding portion that is situated between an upper cushioning element and a lower cushioning element.

The holding arms may be uniformly distributed in the circumferential direction of the bearing apparatus.

The holding arms are preferably oriented radially with respect to the drive shaft.

It may be provided, for example, that three, four, or five holding arms project externally from the bearing apparatus.

It is advantageous if the upper cushioning element and/or the lower cushioning element form(s) a positive fit with the holding portion, thus simplifying installation of the device. The upper cushioning element and/or the lower cushioning element may have a recess in which the holding portion engages. The upper cushioning element as well as the lower cushioning element advantageously each comprise a recess, the two cushioning elements in each case surrounding the holding portion over a range of 180° in the peripheral direction.

The holding arms may be configured as a round or polygonal profile.

In one advantageous embodiment, the holding arms are configured as a square profile, which imparts particularly high stability to the device.

The holding arms are preferably formed as a hollow profile.

To reduce the mechanical load on the cushioning elements, in the configuration of the holding arms in the form of square profiles it is advantageous if the cushioning elements have a cut-out that is associated in each case with a corner region of the square profile. The risk of the cushioning elements tearing in the vicinity of a corner region of the square profile may be minimized in this way.

The frame of the device according to the invention is preferably formed as a transport carriage, and has a base plate on which the at least one lower cushioning element rests. The holding apparatus may be supported on the base plate by means of the at least one lower cushioning element.

The base plate may have a central hole through which the bearing apparatus passes. Above the base plate, the bearing apparatus is preferably fixedly connected to the holding apparatus, which is supported on the base plate by means of the at least one lower cushioning element. The at least one upper cushioning element may rest against the top side of the holding apparatus, and may act on same with a compressive force when the holding apparatus is deflected from the central position.

Advantageously a drive unit having a drive motor via which the drive shaft is rotationally drivable is mounted on the bearing apparatus. A gearing, in particular a miter gearing, may be connected between the drive motor and the drive shaft.

As mentioned at the outset, the invention further relates to a vehicle washing system having at least one device of the type stated above, and having a side washing brush which is mounted on the device.

The vehicle washing system preferably has a gantry having two stanchions which are laterally positionable next to the vehicle to be cleaned, and having a crossmember which extends above the vehicle and connects the two stanchions to one another. At least one device of the above-mentioned type for supporting the side washing brush may be situated on the crossmember.

The frame of the device is preferably movable along the crossmember of the vehicle washing system. For this purpose, the frame may be designed in the form of a transport carriage, and may include running wheels by means of which the frame is movable along the crossmember.

The following description of a preferred embodiment of the invention serves to provide a more detailed explanation in conjunction with the drawings.

DETAILED DESCRIPTION OF THE INVENTION

Figure 1:
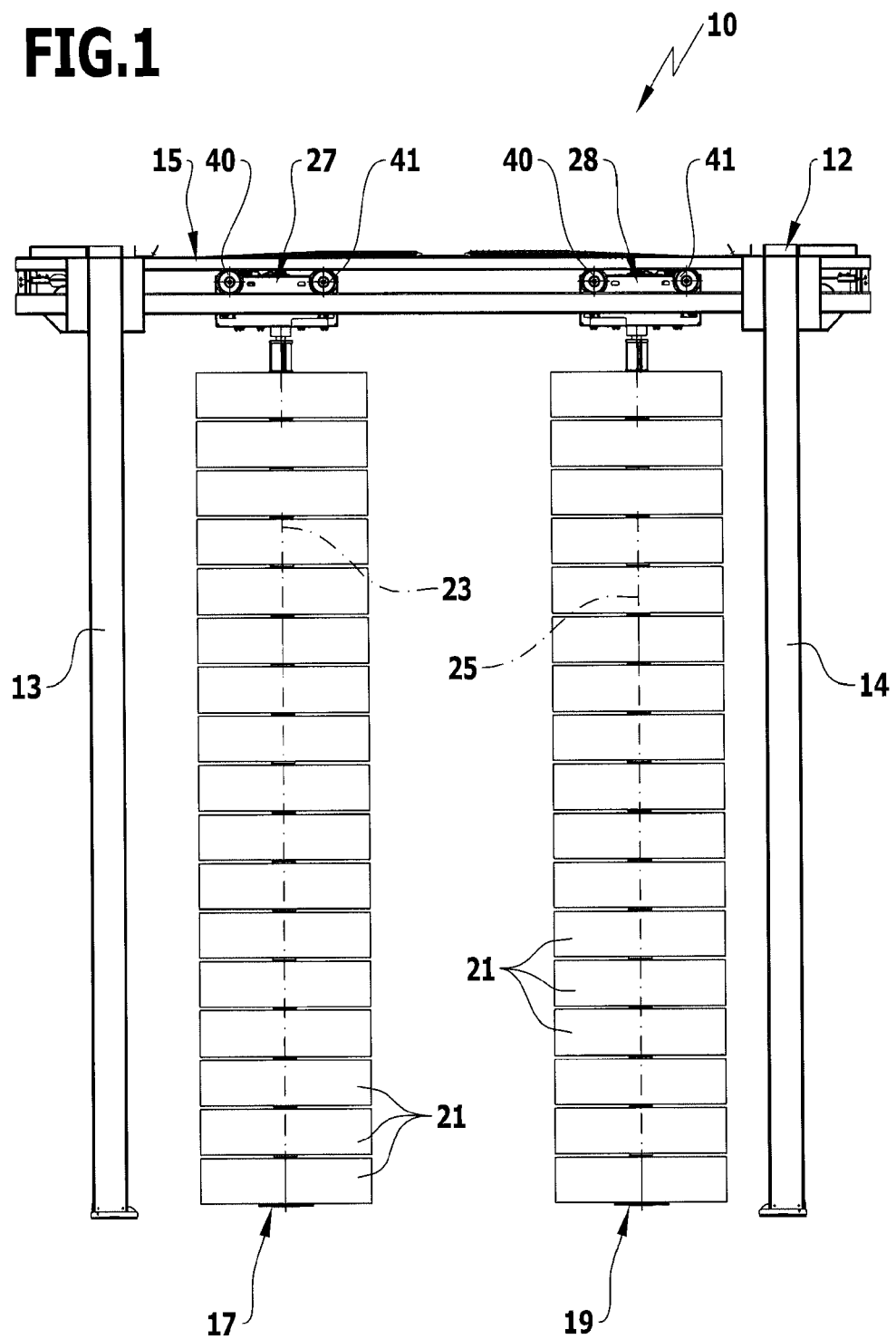
FIG. 1 shows a front view of a vehicle washing system according to the invention, having two side washing brushes which in each case are mounted on a device according to the invention so as to be rotatable about their rotational axis.

FIG. 1 schematically illustrates a vehicle washing system 10 according to the invention, having a gantry 12 which has two vertical stanchions 13, 14 that are connected to one another at their upper ends via a horizontal crossmember 15. A first side washing brush 17 and a second side washing brush 19 are mounted on the crossmember 15 so as to be movable along the crossmember 15. In the illustrated exemplary embodiment, the two side washing brushes 17, 19 are equipped with washing elements in the form of non-woven strips 21. Alternatively, the side washing brushes 17 and 19 may be equipped with bristles.

The side washing brushes 17 and 19 in each case are rotationally drivable about their rotational axis 23 and 25, respectively, and may be swiveled from their vertical position illustrated in FIG. 1 for cleaning side areas of a vehicle which extend at an angle. For this purpose, the side washing brushes are mounted on support devices 27, 28 according to the invention which are identical and by means of which the side washing brushes may be moved along the crossmember 12. Since the support devices 27, 28 have identical designs, only the support device 27 is explained in detail below. However, the explanations apply in the same manner to support device 28.

Figure 2:
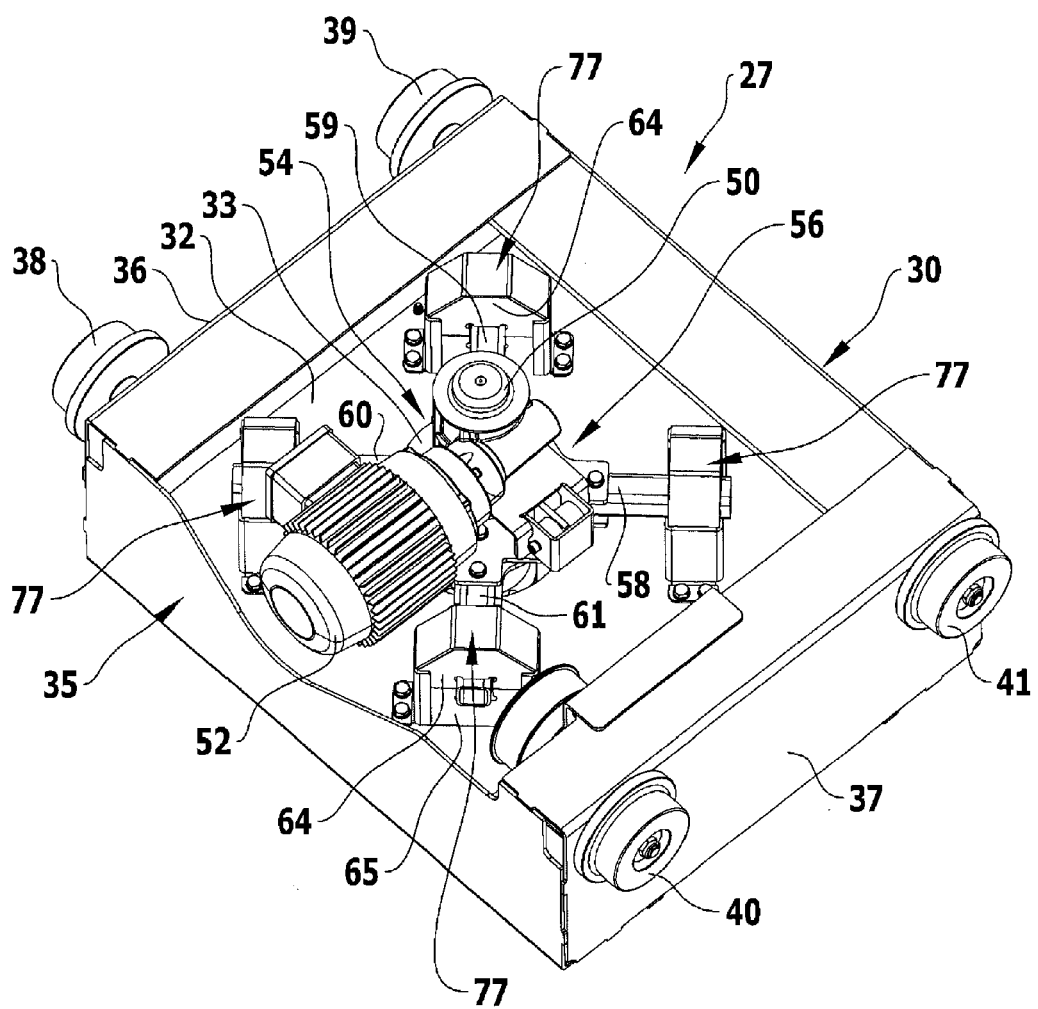
FIG. 2 shows a perspective illustration of a device according to the invention for supporting a side washing brush, having a frame, formed as a transport carriage, on which a holding apparatus is elastically held by means of cushioning elements.
Figure 3:
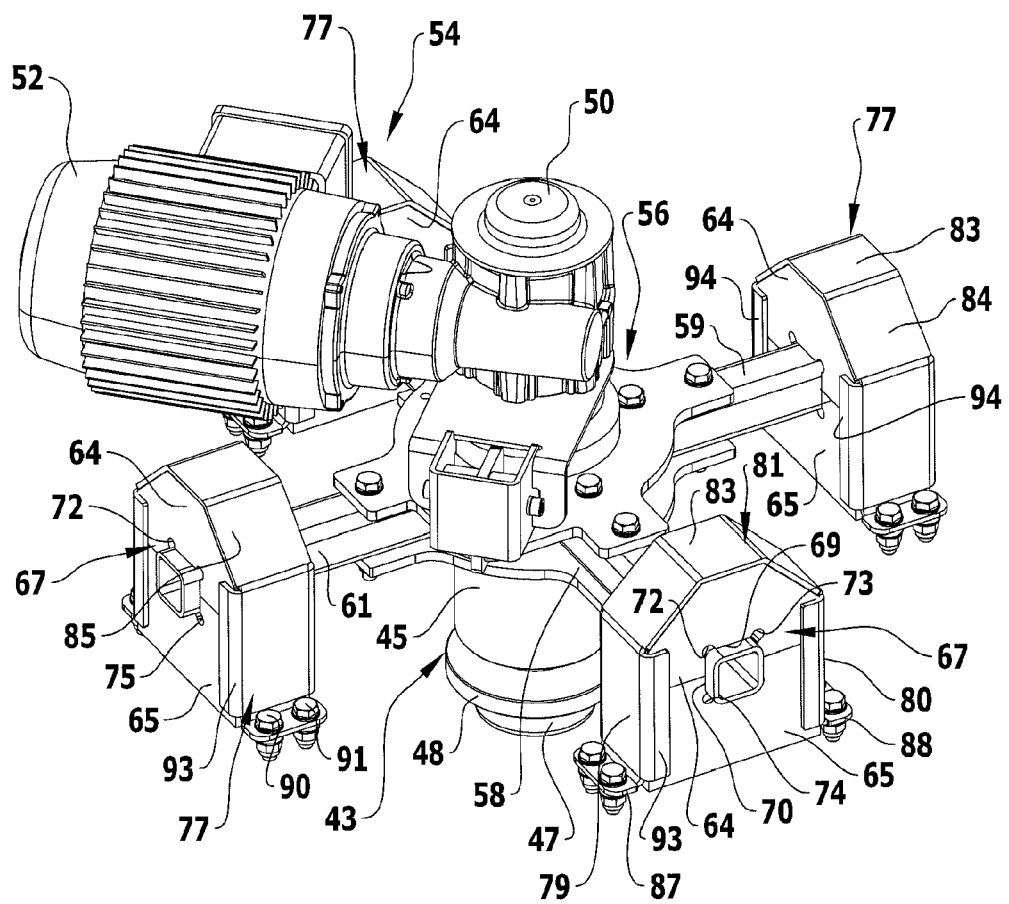
FIG. 3 shows a perspective illustration of a device according to the invention, without the transport carriage.

The support device 27 is schematically illustrated in FIGS. 2 and 3. The support device includes a frame which is designed in the form of a transport carriage 30 and which has a base plate 32 with a central through hole 33. The base plate 32 is surrounded by a box-shaped structure 35 which carries outwardly projecting running wheels 38, 39 and 40, 41 on oppositely facing longitudinal sides 36, 37, respectively. The transport carriage 30 may be moved along the crossmember 15 by means of the running wheels 38, 39 and 40, 41. A bearing apparatus 43 passes through the through hole 33 in the base plate 32. The bearing apparatus includes a rotary bearing 45 in which a drive shaft 47 is rotatably supported. In its end region which protrudes downwardly from the rotary bearing 45, the drive shaft 47 carries a flange 48. The side washing brush 10 is connectable to the flange 48 to rotate with the flange.

A miter gearing 50, via which the drive shaft 47 is connected to the motor shaft of a drive motor 52 laterally positioned on the miter gearing 50, is situated above the bearing apparatus 43. The miter gearing 50 in combination with the drive motor 52 forms a drive unit 54.

For mounting the bearing apparatus 43 on the base plate 32 of the transport carriage 30, a holding apparatus 56 is used which has four holding arms 58, 59, 60, and 61 oriented radially with respect to the drive shaft 47, the holding arms in each case being formed as a square profile and oriented perpendicularly to one another. The free end regions of the holding arms 58, 59, 60, and 61 in each case form a holding portion on which an upper cushioning element 64 and a lower cushioning element 65 are situated. The upper cushioning element 64 in combination with the associated lower cushioning element 65 forms a two-part cushion ring 67, made of an elastic rubber material, which completely encloses the holding portion of the particular holding arm 58, 59, 60, or 61 in the peripheral direction. The lower cushioning element 65 is supported on the base plate 32, and the upper cushioning element 64 rests on the lower cushioning element 65, with the holding portion of a holding arm 58, 59, 60, or 61 in between. The two cushioning elements 64 and 65 have a U-shaped recess 69 and 70, respectively, into which the respective holding arm 58, 59, 60, or 61 is engaged in a positive-fit manner. Associated with the corner regions of the holding arm, the recesses 69 and 70 have an additional cut-out 72, 73 and 74, 75, respectively, which ensures that the cushioning elements 64, 65 do not tear in the corner region of the respective holding arm 58, 59, 60, or 61.

The upper cushioning element 64 together with the lower cushioning element 65 is surrounded by a counter-support, which in the illustrated exemplary embodiment is configured as a U-shaped clamp 77 formed from a flat material, preferably sheet metal. The clamp has a first leg 79 and a second leg 80 which are connected to one another in one piece via a web 81 and which are oriented perpendicular to the base plate and parallel to the drive shaft 47. In the illustrated embodiment, the web 81 has a V-shaped configuration and has a web base 83, that extends parallel to the base plate 32 and is connected to the first leg 79 and the second leg 80 via web flanks 84 and 85, respectively, which extend at an angle.

At their free ends, the legs 79 and 80 carry a holding tab 87, 88, respectively, through each of which two screws 90, 91 pass. The holding tabs 87 and 88 may be screwed to the base plate 32 by means of the screws 90, 91. At their longitudinal edges extending perpendicularly to the base plate 32, the legs 79 and 80 carry rounded projections in the form of retaining strips 93, 94 which engage behind the upper cushioning element 64 and the lower cushioning element 65.

The first side washing brush 17 may be set in rotation about the rotational axis 23 by the drive motor 52 via the miter gearing 50 and the drive shaft 47. The entire drive unit 54 together with the bearing apparatus 43 is supported on the base plate 32 via the holding apparatus 46 and the lower cushioning elements 65. In order to clean vehicle parts that are oriented at an angle with respect to the vertical, the first side washing brush 17 may be inclined with respect to the vertical. A lower cushioning element 65 of a first cushion ring 67 and an upper cushioning element 64 of a diametrically opposed second cushion ring may be compressed so that, via the respective holding arm, they exert an elastic restoring force on the bearing apparatus 43 and the side washing brush 17 mounted thereon. The cushioning elements 64 and 65 are able to exert only compressive forces on the holding arms 58, 59, 60, 61 by compression of the cushioning elements 64 and 65. However, the cushioning elements 64 and 65 are not able to act on the respective holding arms 58, 59, 60, and 61 with a tensile force. The cushioning elements 64 and 65 rest against the top and bottom sides of each holding arm 58, 59, 60, or 61, but are not connected to the respective holding arm 58, 59, 60, or 61 in a force-fit manner by means of connecting elements. For example, if the holding arm 58 lifts away from the lower cushioning element 65 during a swivel motion of the side washing brush 17, the upper cushioning element 64 is compressed and exerts a compressive force on the holding arm 58. However, due to the lack of a force-fit connection to the lower cushioning element 65, the lower cushioning element exerts no tensile force on the holding element 58; i.e., the lower cushioning element is not subjected to tensile stress.

Because the cushioning elements 64 and 65 are subjected only to compression stress, not tensile stress, during any given swivel motions of the side washing brush 70, the risk of damage to the cushioning elements 64 and 65 themselves during large deflections of the side washing brush 17 is low.

Similarly to the way in which the first side washing brush 17 is held on the support device 27, the second side washing brush 19 is held on the identically-formed support device 28. Once again, it is ensured that the holding arms 58, 59, 60, and 61 are elastically held on the base plate 32 via a cushion ring 67, the cushion ring 67 having an upper cushioning element 64 and a lower cushioning element 65 which are subjected only to compression stress, but not tensile stress, during any given swivel motion of the side washing brush 19.

The vehicle washing system 10 according to the invention is therefore characterized by a long service life.

The invention claimed is:

1. A device for supporting a side washing brush of a vehicle washing system, which brush is rotatable about a rotational axis, the device including a bearing apparatus for rotatably supporting a drive shaft, and a holding apparatus which is connected to the bearing apparatus and which is held on a frame by means of elastic cushioning elements arranged above and below the holding apparatus, wherein the holding apparatus is adapted to be acted on by the cushioning elements only by compressive forces aligned in the direction of the holding apparatus.

2. The device according to claim 1, wherein an upper cushioning element and a lower cushioning element in each case are jointly surrounded by a rigid counter-support which is fixed to the frame.

3. The device according to claim 2, wherein the counter-support has a C-, Ω- or U-shaped configuration.

4. The device according to claim 2, wherein the counter-support is formed from a flat material.

5. The device according to claim 2, wherein the counter-support is detachably connectable to the frame.

6. The device according to claim 1, wherein in each case an upper cushioning element rests on a lower cushioning element.

7. The device according to claim 1, wherein the holding apparatus has a plurality of holding arms, each of which has a holding portion that is situated between an upper cushioning element and a lower cushioning element.

8. The device according to claim 7, wherein at least one of the upper cushioning element and the lower cushioning element forms a positive fit with the holding portion.

9. The device according to claim 7, wherein at least one of the upper cushioning element and the lower cushioning element has a recess in which the holding portion is engaged.

10. The device according to claim 7, wherein the holding arms are configured as a square profile.

11. The device according to claim 10, wherein the upper and the lower cushioning elements have a cut-out that is associated in each case with a corner region of a square profile.

12. The device according to claim 1, wherein in each case an upper cushioning element lies with surface-to-surface contact against a lower cushioning element.

13. The device according to claim 1, wherein the frame is formed as a transport carriage, and has a base plate on which the lower cushioning elements rest.

14. The device according to claim 1, wherein a drive unit having a drive motor which rotationally drives the drive shaft is mounted on the bearing apparatus.

15. A vehicle washing system having at least one device according to claim 1 and having a side washing brush which is mounted on the device.

16. The vehicle washing system according to claim 15, wherein the frame is movable along a crossmember of the vehicle washing system.

* * * * *